United States Patent [19]
Delagi et al.

[11] Patent Number: 5,655,121
[45] Date of Patent: Aug. 5, 1997

[54] METHOD AND APPARATUS FOR ENCODING DATA TO BE SELF-DESCRIBING BY STORING TAG RECORDS DESCRIBING SAID DATA TERMINATED BY A SELF-REFERENTIAL RECORD

[75] Inventors: Bruce Alfred Delagi; Nakul P. Saraiya, both of Palo Alto; Jaikumar Ramanathan, San Carlos, all of Calif.

[73] Assignee: Sun Microsystems, Inc., Mountain View, Calif.

[21] Appl. No.: 684,492

[22] Filed: Jul. 19, 1996

Related U.S. Application Data

[63] Continuation of Ser. No. 233,297, Apr. 26, 1994, abandoned.
[51] Int. Cl.$^6$ ................................................. G06F 11/00
[52] U.S. Cl. ........................ 395/704; 395/612; 395/613; 395/615
[58] Field of Search .................................. 395/704, 612, 395/613, 615

[56] References Cited

U.S. PATENT DOCUMENTS

| | | | |
|---|---|---|---|
| 4,025,901 | 5/1977 | Bachman et al. | 364/200 |
| 4,068,300 | 1/1978 | Bachman | 364/200 |
| 4,462,077 | 7/1984 | York | 364/300 |
| 4,507,752 | 3/1985 | McKenna et al. | 364/900 |
| 4,636,940 | 1/1987 | Goodwin, Jr. | 364/200 |
| 4,802,165 | 1/1989 | Ream | 395/183.14 |
| 4,821,178 | 4/1989 | Levin et al. | 364/200 |
| 5,101,494 | 3/1992 | Bilski et al. | 395/700 |
| 5,121,501 | 6/1992 | Baumgartner et al. | 395/800 |
| 5,129,084 | 7/1992 | Kelly, Jr. et al. | 395/650 |
| 5,133,068 | 7/1992 | Crus et al. | 395/600 |
| 5,313,636 | 5/1994 | Noble et al. | 395/700 |

FOREIGN PATENT DOCUMENTS

WO9325964 12/1993 WIPO.

OTHER PUBLICATIONS

"Lightweight Trace and Interpreter for Inter-Process Timing Problems," IBM Technical Disclosure Bulletin, vol. 35, No. 1B, pp. 321–322 (Jun., 1992).

*Primary Examiner*—Kevin A. Kriess
*Assistant Examiner*—Lucien Toplu
*Attorney, Agent, or Firm*—Blakely, Sokoloff, Taylor & Zafman

[57] ABSTRACT

A computer-implemented method and apparatus in a computer system of processing data generated by a first application program in a second application program during runtime. During runtime, the first application program generates a record including a plurality of fields, wherein at least one of the plurality of fields contains data generated by the first application program. Other of the plurality of fields containing descriptive information regarding the data. The record also includes a reference (e.g. a pointer, relative or absolute) to a tag record. The tag record describes the plurality of fields contained in the record. The tag record further recursively references a plurality of tag records each referencing an associated tag record identifying fields in a referred-to tag record. This continues, recursively, until ultimately, a root record is referenced including a self-referential tag identifying the fields in the root record. The second application program then receives the record, and references the tag record and each of the plurality of tag records, recursively, until reaching the root record in order to identify the data by referencing the plurality of fields in each of the tag records. In this manner, the data contained in the record is thus self-describing. The second application program then manipulates the data according to the identification of the data specified by the record, the tag record and each of the plurality of tag records.

24 Claims, 7 Drawing Sheets

METHOD AND APPARATUS FOR ENCODING DATA TO BE SELF-DESCRIBING BY STORING TAG RECORDS DESCRIBING SAID DATA TERMINATED BY A SELF-REFERENTIAL RECORD

This is a continuation of application Ser. No. 08/233,297 filed Apr. 26, 1994, now abandoned.

BACKGROUND OF THE INVENTION

1. Field of the Invention

The present invention relates to data processing systems. More specifically, the present invention relates to a method and apparatus for encoding data in such a way that the data describes itself, so that the data may be manipulated in a predetermined manner associated with the indicated data type.

2. Background Information

As software development becomes increasing prevalent and, used in circumstances which formerly applied discrete electronics to perform desired functions, needs for testing and verification of the functionality of software become more and more important. One prior art method of testing software includes the use of so-called probes and traces. Probes are a means of distinguishing points in code, and perhaps, generating an event record, although other things can be done. A trace is a time-linear (or, at least, causally ordered) collection of records of some set of the distinguished events in the execution of a program or set of programs. A probe, like a test point in circuitry, is a place at which a developer may evaluate the performance of the running program. Some probes may be selectively enabled or disabled depending upon operating circumstances, so that object code can generate probe information without requiring that a programmer modify the source code for the program. Thus, probes within an executable routine may be selectively enabled or disabled in groups at run-time without modification of the underlying source code. Thus, a programmer may determine faults in a program without knowing anything about the internals of the operational code (although this is certainly helpful).

We may categorize probes into two classes: manual probes; and automatic probes. Manual probes are inserted by a programmer by hand into the source code of a program. They are used by the programmer for detailed debugging and performance analysis. A sub-class of manual probes are known as semantic probes with effects that are documented as part of the program or library interface. Typically, these are used to provide external debugging or performance analysis information. Automatic probes are those which are inserted into existing run-time programs by tools without direct programmer manipulation of the source code. Automatic probes may be inserted by a pre-processor or by operating on processed binaries, and may provide such information as procedure exit and entry points. Automatic probes may be selectively enabled and disabled at run-time to specifically analyze certain performance problems.

One of the problems with prior art probes and tracing is that data is expected by the test engineer only in a certain format. Typically, the data is presented in a raw form, wherein the test engineer must determine what the data returned from the probes represents. Thus, the test engineer evaluating an executable program which generates information from probes must have an intimate understanding of the probe information provided at program run-time. Unfortunately, in many instances, such information is not available, or may be obscured by the original programmer of the application program under test. Thus, it is desirable that a program generating probes provide information about the probes in a standardized manner so that diagnosis of the programs under test may be most easily accomplished without a detailed understanding of the internal functioning of the program under test. Prior art techniques of inter-process communication in environments such as testing, typically require information extraneous to the data to discern the type of data returned from the program.

SUMMARY OF THE PRESENT INVENTION

A computer-implemented method and apparatus in a computer system of processing data generated by a first application program in a second application program during runtime. During runtime, the first application program generates a record including a plurality of fields, wherein at least one of the plurality of fields contains data generated by the first application program. Other of the plurality of fields containing descriptive information regarding the data. In implemented embodiments, this may include, fields for representing checkpoints in the program, such as a relative address at which the checkpoint occurred, and/or a time at which the checkpoint was reached. The record also includes a reference (e.g. a pointer, relative or absolute) to a tag record. The tag record describes the plurality of fields contained in the record (e.g. the names and types of the fields). The tag record further recursively references a plurality of tag records each referencing an associated tag record identifying fields in a referred-to tag record. This continues, recursively, until ultimately, a root record is referenced including a self-referential tag identifying the fields in the root record. The second application program then may receive the record (e.g. during computer system runtime, for example, during execution of a test suite), and references the tag record and each of the plurality of tag records, recursively, until reaching the root record in order to identify the data by referencing the plurality of fields in each of the tag records. In this manner, the data contained in the record is thus self-describing. The second application program then manipulates the data according to the identification of the data specified by the record, the tag record and each of the plurality of tag records, such as by filtering data contained in the record which is not required by the test suite, or by reformatting the data into a form more appropriate for examination by a user or a post-processing program.

BRIEF DESCRIPTION OF THE DRAWINGS

The present invention is illustrated by way of example and not limitation in the figures of the accompanying in which like references indicate like elements and in which.

DETAILED DESCRIPTION

A portion of the disclosure of this patent document contains material which is subject to copyright protection and to which a claim of copyright protection is made. The owner has no objection to the facsimile reproduction by anyone of the patent disclosure, as it appears in the Patent and Trademark Office patent files or records, but otherwise reserves all copyrights and similar rights whatsoever.

The present invention is related to inter-process communication and the representation of data facilitating such inter-process communication for such applications as testing. Although the present invention will be described with reference to certain specific implemented embodiments and examples of such which use the data structure and formats to be described here for the application of testing, it can be appreciated by one skilled in the art that such self-describing data formats may be used for any number of applications as desired by implementors of this invention. Other advantages and applications for implemented embodiments will become apparent, to one skilled in the art, and may be practiced without these specific details without departing from the overall spirit and scope of the present invention.

The present invention is implemented as a series of data structures and accompanying instructions implemented in a computer program which is operative within a computer system. Such data structures may be created in a computer system as illustrated in the block diagram of FIG. 1.

Figure 1:
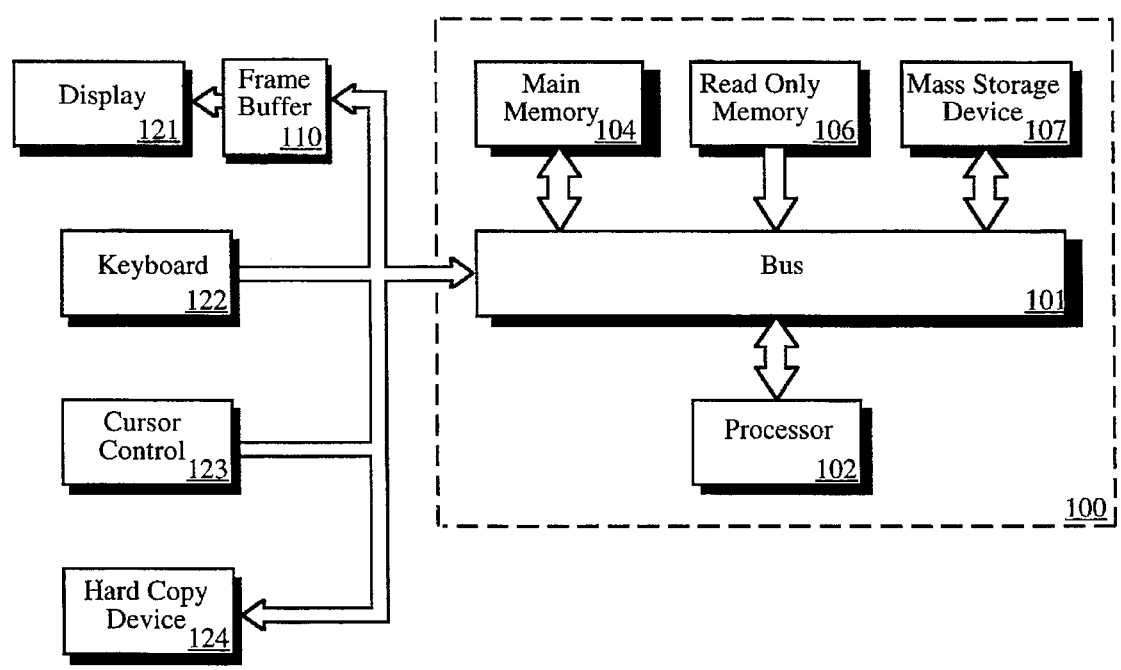
FIG. 1 illustrates a system upon which one embodiment of the present invention may be implemented.

Referring to FIG. 1, a system upon which one implementation of the present invention is implemented is shown as 100. 100 comprises a bus or other communication means 101 for communicating information, and a processing means 102 coupled with bus 101 for processing information. System 100 further comprises a random access memory (RAM) or other volatile storage device 104 (referred to as main memory), coupled to bus 101 for storing information and instructions to be executed by processor 102. Main memory 104 also may be used for storing temporary variables or other intermediate information during execution of instructions by processor 102. System 100 also comprises a read only memory (ROM) and/or other static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions. This may be used for storage of the databases to be described here which maintain information about currently defined problem descriptions using commercially available software products.

System 100 may further be coupled to a display device 121, such as a cathode ray tube (CRT) or liquid crystal display (LCD) coupled to bus 101 for displaying information to a computer user. Such a display 121 may further be coupled to bus 101 via a frame buffer 110, which information such as a single or multiple frames or images for display upon display device 121. An alphanumeric input device 122, including alphanumeric and other keys, may also be coupled to bus 101 for communicating information and command selections to processor 102. An additional user input device is cursor control 123, such as a mouse, a trackball, stylus, or cursor direction keys, coupled to bus 101 for communicating direction information and command selections to processor 102, and for controlling cursor movement on display 121.

Note, also, that any or all of the components of system 100 and associated hardware may be used in various embodiments, however, it can be appreciated that any configuration of the system may be used for various purposes according to the particular implementation.

In one embodiment, system 100 is one of the Sun Microsystems® brand family of workstations such as the SPARC-station workstations manufactured by Sun Microsystems® of Mountain View, Calif. Processor 102 may be one of the SPARC brand microprocessors manufactured by Sun Microsystems® of Mountain View, Calif. (Sun Microsystems® of Mountain View, Calif.).

Note that the following discussion of various embodiments discussed herein will refer specifically to a series of routines which are generated in a high-level programming language (e.g., the C language) and compiled, linked, and then run as object code in system 100 during run-time, for example by the SPARCompiler available from Sun Microsystems® of Mountain View, Calif. Specifically, the present invention is operative in conjunction with various software libraries, such as the Solaris® threads package available from SunSoft, Inc. of Mountain View, Calif. (Sun, Sun Microsystems and Solaris are trademarks of Sun Microsystems of Mountain View, Calif. SPARC and SPARC station are trademarks of SPARC International, Inc. and are licensed exclusively to Sun Microsystems). It can be appreciated by one skilled in the art, however, that the following methods and apparatus may be implemented in special purpose hardware devices, such as discrete logic devices, large scale integrated circuits (LSI's), application-specific integrated circuits (ASIC's), or other specialized hardware. The description here has equal application to apparatus having similar function.

The present invention implements a system wherein the application programmer generating the program under test specifies "probes" in the source code of the program so that the probes may later be activated at system run-time, depending upon certain parameters specified during the invocation of the executable program, causing the probes to generate records which may be examined by a second application program or user (e.g., a test engineer). In this manner, application programs under test may provide information regarding the data that they are processing, including, descriptive information which is included in the records which are generated from the application program under test itself. The details of this will be discussed in more detail below, however, the operation of such a mechanism is illustrated with reference to FIG. 2.

Figure 2:
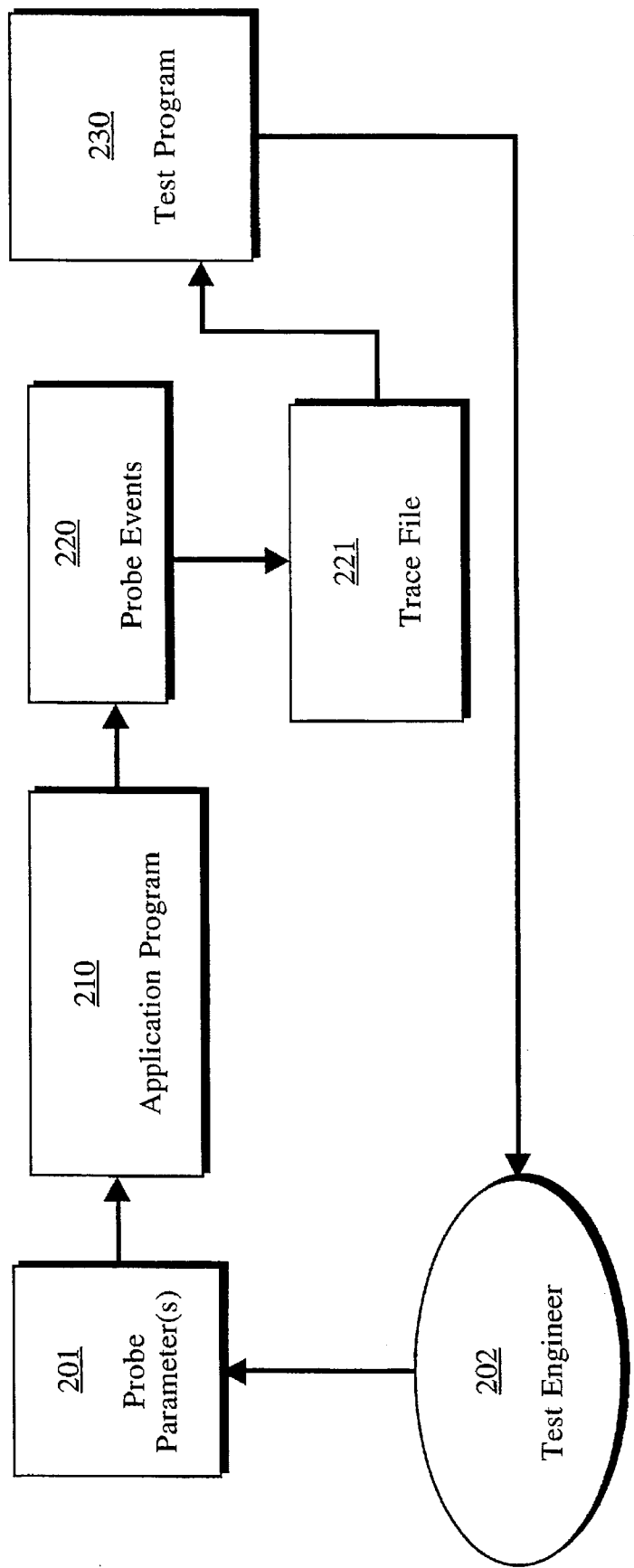
FIG. 2 shows a relationship between an application program under test and a test suite program and the communication between those two executable programs.
Figure 3:
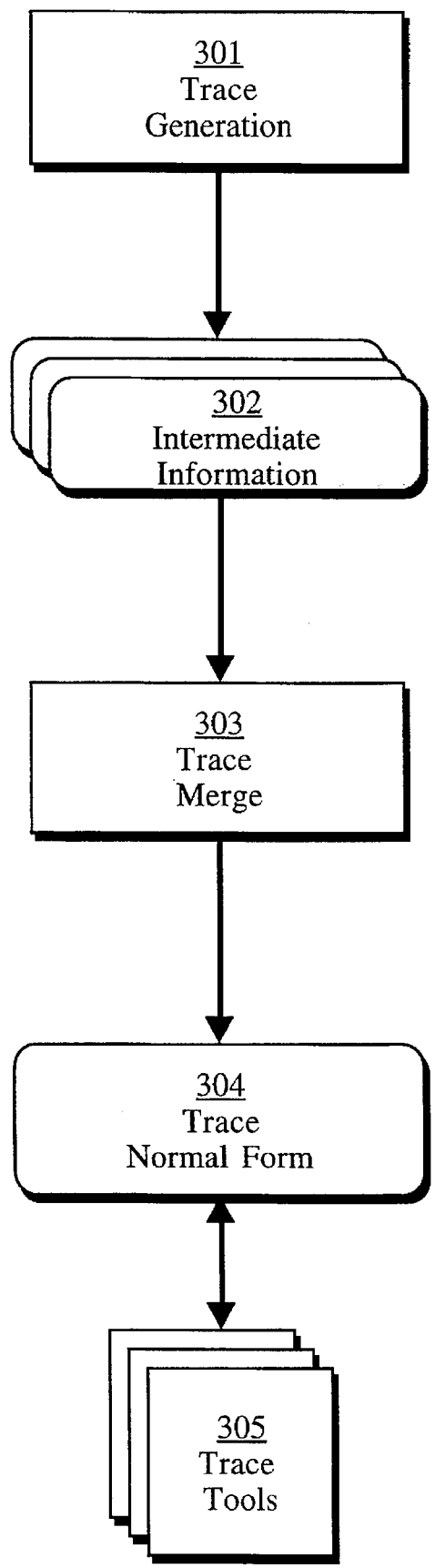
FIG. 3 illustrates the processing of various trace information and intermediate information as may be performed in a system implementing the embodiments of the present invention.

200 of FIG. 2 illustrates an application program 210 typically a program under test which may be invoked with certain probe parameters 201. This may include, such arguments specified by a test engineer 202 or other mechanism which specifies certain probes or groups of probes which will be activated upon invocation of the application program. The application program then generates probe events 220, which are placed into a trace file 221 which contains trace records (to be described below) which may indicate the status of various probes which have been inserted into the application program. By detection that the probe parameters 201 have specified that certain probes or groups of probes should be activated, then probe events 220 placed into the trace file 221 is generated which may be examined by a second program 230, typically a test suite or other application program which can receive and process the probe events 220 via the trace file 221. The trace file 221 contain references to records which contain the data themselves from within the application program 210, along with some identifying information. The generation and placement of records into a file such as trace file 221 is provided by the memory mapping (mmap) facilities of the Sun Operating System which is used in implemented embodiments such that the virtual memory requested of records generated using implemented embodiments is captured as a memory image in the file system of computer system 100. In other computer system platforms, either similar memory mapping facilities for file creation can be used or other areas of storing records in a non-volatile medium (e.g., 107 of FIG. 1) may be used. This will now be discussed.

As already discussed, probes are inserted by either the application programmer, or some automated tool which is responsible for inserting such probes at predetermined points within an application program's code (source or object code). The application programmer references the data structures to be discussed here by inserting a reference in his source code to the header file "tnf_probe.h" or simply "probe.h" which is a collection or "library" of the "building blocks" for probe creation. Samples of references to the types defined in probe.h will be shown in the descriptive programming segments which follow below. Probes may be selectively enabled or disabled either by group or by specific probe names. It is anticipated that in certain implemented embodiments that a procedure to enable and disable probes will be used by a programmer desiring to activate given probes upon invocation of the application program under test. Other manners of activating probes which are present within the source code of a particular program may be activated or deactivated at system run-time according to a particular implementation.

Once probes are enabled, the probes generate information either by way of events such as the probe events 220 stored in trace file 221 which is a collection of trace "records" in a single predetermined implementation-dependent format. For the purposes of the remainder of this application, implemented embodiments of the present invention use a standard method of representing data obtained from probes inserted in the source code of an application program in a format known as "Trace Normal Form" (TNF) that can be read, processed and otherwise manipulated in a variety of ways for different implementation-dependent applications. The records in this file can be sorted so as to be in causal order between machines or in temporal order within a particular machine. They may also be sorted so that the trace file begins with all the information required to interpret the remainder of the file. In one embodiment, the generator of the TNF file may filter or remove probe records which are not currently of interest to extract just what is of interest from the perspective of a particular test engineer or test suite.

Thus, trace generation 301, such as from the application program 210 or other program under test as shown in FIG. 2, may generate intermediate information 302 such as the trace record in Trace Normal Form. Then, this intermediate information 302 is processed such as by a test program or other tool into a trace merge file 303. Then, a process which performs a trace merging function 303 may take the intermediate information 302 and sort it in either causal or other order and place all the information into a Trace Normal Form 304. Once the Trace Normal Form file has been generated, then certain trace tools 305 may use the information such as from a test engineer or other person examining the data, in order to extract information of interest.

Implemented embodiments of the present invention provide a means for identifying the records and thus the data contained within the records generated by probe events. In this manner, the test suite or engineer performing testing of the program under test need not have any detailed information about the data contained within the program under test. Instead, specific records may be examined, and by this scheme of storing the data known as Trace Normal Form, the data contained within the event records may be determined. The details and the mechanics of this will now be discussed.

Figure 4:
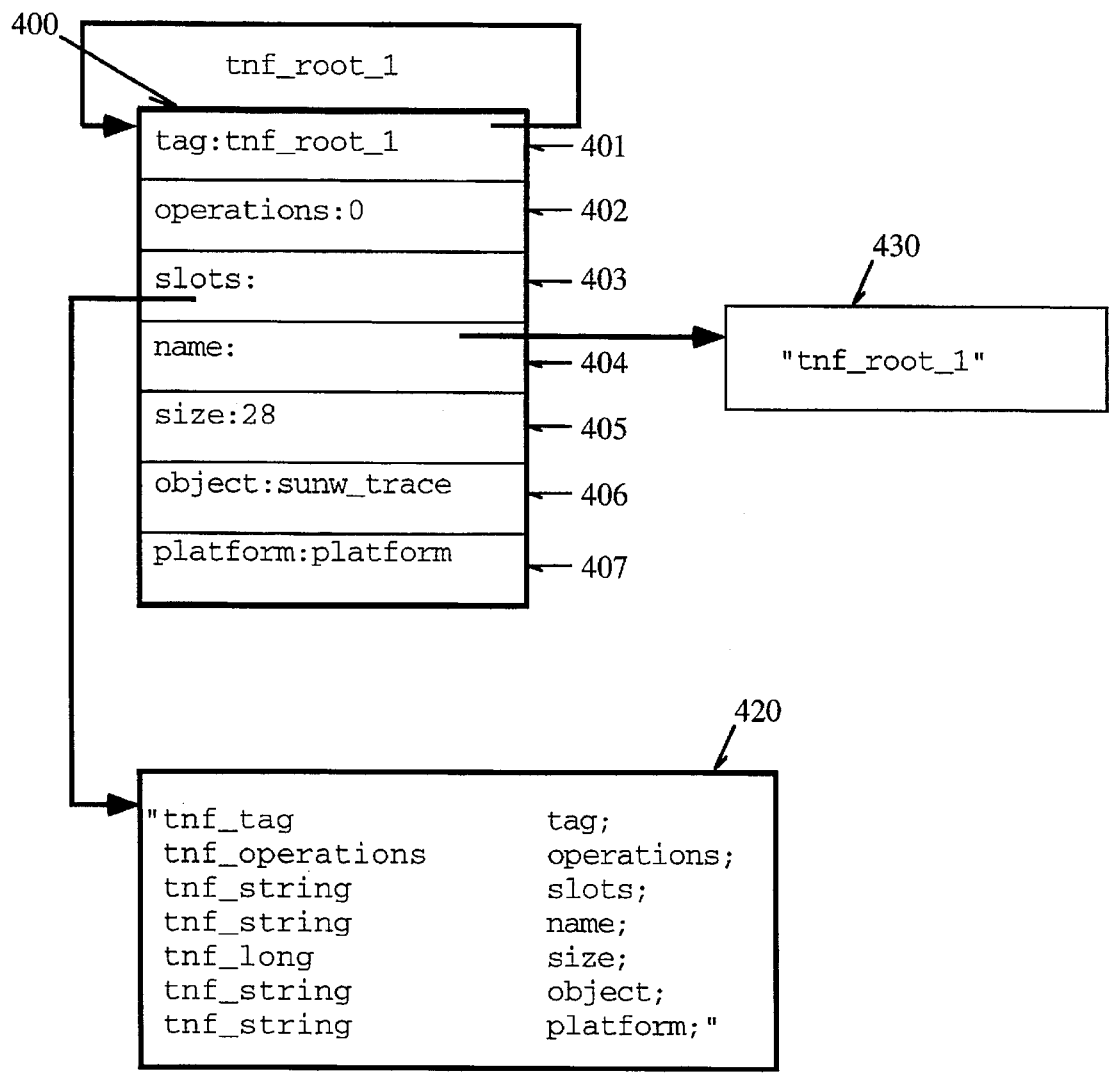
FIGS. 4–7 show various data structures which may be created and used in implemented embodiments of the present invention.

The results of execution of an application program under test with certain probe parameters specified is a collection of trace records known as a trace file. A trace file is represented in Trace Normal Form (TNF) and includes a root record which is used to bootstrap TNF analysis. In implemented embodiments of the present invention, there is a minimal set of format dependencies upon which this bootstrapping depends. As illustrated in FIG. 4, such a root file as 400 has a field 401 containing a self-relative pointer and a second field 403 which references a record 420 containing an ASCII string which provides the names of the fields in their order in the record. The names in 420 begin after a first two fields in the record which contain header information. In implemented embodiments, the string is null terminated, however, it can be appreciated by one skilled in the art that the string may be represented in another format, for example, having a length field preceding the contents of the string. Other than the first and third fields 403, for example, in a TNF record containing a reference to a string containing the names of the records, no other fields in TNF records need to be fixed. Details of this will be discussed with reference to some specific examples below.

As illustrated in FIG. 4, and the descriptive segment shown below, root record names prefixed with tnf_root are used to indicate files with tag records that all include tnf_tag, and tnf_operations fields in the same positions as observed in the root record. The field named tnf_operations, or simply operations, is used during analysis by test routines to hold a pointer to interpretation procedures for the kind of record described by the associated tag record. The record being described points at its tag record as do all records of that type. The operations field of the tag record is used to access procedures operating on that kind of record quickly, for example, to perform coercion or translation operations or other types of operations frequently performed during analysis.

The tnf_tag field in a record, that shown as 401 in FIG. 4, is a field whose name includes "tnf_tag" as a prefix. A root record such as 400 holds a self-relative pointer to a "tag record" that describes the record. Thus, a root record such as 400 shown in FIG. 4, describes itself, whereas other tag records in the TNF file structure typically describe other records. An example of a tnf_root record is shown as 400 in FIG. 4, and a descriptive code segment which is used for specifying the record is shown below. The "slots field" 403 contains a pointer to a string identifying all the fields in the record. Unlike other records which do not describe themselves, the string describes all the records contained within the tnf_root record 400. That is, each semicolon-delimited pair of strings indicates the TNF type and the name of the field contained within the record. Thus, there is a 1:1 correspondence between each of the fields contained within the root record and each the semicolon-delimited pairs of strings 420 referenced by field 403. In this manner, the data contained within the root record is self-describing, such that once the "slots" field is referenced, it may be used to determine the contents of the TNF root record in this instance. For other tag records, this field is used to describe the record which references the tag record. This will be shown in more detail below.

In the descriptive segment below, colon-terminated names are used simply for notational purposes as they indicate the name of the field but they do not appear in the file. These also appear in 400 of FIG. 4, although the contents of the actual field are shown after the colon. Arrows in the descriptive segment are used to indicate reference to another record, whose contents are pointed by the arrow. Thus, in the figure, fields such as 403 and 404 actually contain references to records containing the strings describing the record. The slots field 403 was already discussed, however, the field 404 also contains a reference to another record 430 containing a string which is the name of the record "tnf_root_1". Contents in the code segment below are self-relative references to the name record—which are identified by double-colon terminators in the notation.

```
tnf_root_1::
   tag:         tnf_root_1
   operations:  0
   slots:       ->    "tnf_tag          tag;
                       tnf_operations   operations;
                       tnf_string       slots;
                       tnf_string       name;
                       tnf_long         size;
                       tnf_string       object;
                       tnf_string       platform;"
   name:        ->    "tnf_root_1"
   size:        28
   object:      sunw_trace
   platform:    platform
sunw_trace::    sunw_trace.so.1"/* versioned and vendored */
platform::      "i86"
```

The strings illustrated in the above example and in FIG. 4 are themselves TNF records (e.g., 420 and 430), that is, tnf_string records which are single-byte ASCII character arrays. In this implementation, names of fields and the names of the types are encoded in the strings, such as those shown above, and describe what exactly is in the file. In other implementations, the names and types may be encoded in separate fields as will be discussed below. TNF files, as already discussed, hold the self-describing data so that an analysis routine or other post-processing program may determine the contents of the TNF file. The size field indicates the size in bytes of the described record. Each field being 4-bytes in length, the size in this example is equal to 28 contained within field 405. The object field 406, in this example, indicates a shared object that indicates procedures whose names are those of the TNF types that have specified interpretations. These procedures supply a set of operations on the specified types. The platform field may be used to qualify the shared object or the operations in it if it is important to determine to type of platform which was the source of data contained within the TNF file. For example, for different architectures supporting big endian/little endian byte ordering, it may be important to know the platform in which the data was created in order that coercion of the data may take place prior to processing by the analysis routine.

Contained within the TNF file is a root record and a number of records that define the basic type system of the TNF file. There will be a significant number of records that record trace events in the trace files. Such an event record and the associated records defining the contents of the event record are illustrated with reference to FIG. 5 and the descriptive segments which follow below. Again, although certain field names have been listed in the figures, this is for notational and convenience purposes only, and the actual contents of the field vary according to the specific field name. At any rate, an event record 550 contains three words 551–553. The first field 551 is broken into two portions 551a and 551b which have specified meanings. The first half of the word 551a is a tag (e.g., pointer or other reference) which references the tag record that describes the event. The second portion 551b of the first word 551 is a schedule offset which is a schedule record which qualifies the event record. This schedule record is itself an event record shown as 560 in FIG. 5, and contains information such as the thread ID, absolute time and other information. Such a record may have any type of information which has been omitted in the figure for the sake of clarity. The next field 552 in the event record indicates the time in nanoseconds relative to the high-order word of the 64-bit absolute time which was included in the referenced schedule record 560 for the event. Also, the address field 553 contains a reference to the data which was probed and caused the event, in some implemented embodiments. This may provide certain information, such as the location at which the variable being probed was located.

In this example, the reference tag known as vm_minor_fault record shown as 500 in FIG. 5 and is illustrated in the descriptive segment which follows below:

```
vm_minor_fault::
   tag:         sunw_base_probe_event_2 /* vendored and versioned */
   operations:  0
   slots:       ->    "tnf_probe_event     tag;
                       tnf_time_delta      time_delta;
                       tnf_void_star       address;"
   name:        ->    "vm_minor_fault"
   size:        12                          /* event record size(bytes) */
   name:        ->    "vm_minor_fault_probe"
   keys:        ->    "vm_microstate"
   detail:      ->    " "
   line:        3859                        /* location of probe in source */
   file:        ->    "vm_faults.c"
   procedure:   0xbce32a94                  /* location of probe in binary */
```

The operations field in the tag record shown above in this implementation may be used by analysis routines to connect the tag records pointed to by event records with the specified operations on the event records. The tag record for the event also describes the contents of the event record 550 (in the "slots" field of the tag record), the number of bytes of the event record (in the "size" field), and includes a reference to a string that names the type of event record (the "name" field of the tag record). This tag record vm_minor_fault is described by tag record 510 which is referenced by the vm_minor_fault tag record 500 via field 501. These are also shown in the descriptive segment which follows below. Thus, the tag record 500 defines the contents of the probe event record 550 as shown in the s lot s field of the segment illustrated above. Again, for the purposes of simplicity, these records have not been illustrated in detail of the block diagram of the records themselves shown in FIG. 5 for convenience and notational purposes only, however, similar to the records illustrated in FIG. 4, the slots field and the name fields are actually references to string records containing strings identifying the tag record.

In another implementation, the TNF records may be formatted in a slightly different way. In this alternative implementation, the vm_minor_fault record discussed above may be formatted in the manner as illustrated by the following descriptive segment:

```
vm_minor_fault::
    tag:          sunw_base_probe_event_2  /* vendored and versioned */
    tag_code:     0
    name:         ->       "vm_minor_fault"
    slot_types:   ->       [tnf_probe_event tnf_time_delta
                            tnf_void_star];
    slot_names:   ->       "tag;
                            time_delta;
                            address;"
    size:         12                       /* event record size(bytes) */
    name:         ->       "vm_minor_fault_probe"
    keys:         ->       "vm_microstate"
    detail:       ->       " "
    line:         3859                     /* location of probe in source */
    file:         ->       "vm_faults.c"
    procedure:    0xbce32a94               /* location of probe in binary */
```

Note that the record is similar to that described with reference to the descriptive segment shown above and illustrated in FIG. 5, however, the operations field has now been entitled "tag code" and the name field now resides at the third word of the record. More significantly, the "slots" field has been divided into two separate fields: slot_types and slot_names. In this example, slot_types is a reference to an array containing references to each of the types for each of the named fields in the record. Then, following the slot_types field is a slot_names field which references the string listing the names for each of the fields having the types specified in the slot_types field. The remaining fields in the record are essentially the same as that illustrated in FIG. 5, as described above, with these minor modifications. In either implementation, it is important that certain of the records appear in predetermined locations in the TNF record so that the routine examining the records in the TNF trace fie can determine the nature of the data contained within it. The particular format described with reference to the short modified code segment in this alternative embodiment as illustrated above, is illustrative of a single record in the more detailed TNF format outlined in Appendix A below. For the remainder of this application, however, for the purposes of consistency, the previously mentioned implementations will be discussed in order to avoid obscuring the present invention.

As already discussed above, the tag records themselves reference tag records which describe the contents of the tag records for records such as probe event records. These are known as "base" TNF types and are shown generally as 510–530 in FIG. 5. Tag records, as already discussed, have tag fields that reference records that also describe the tag records, and this continues recursively down to the root record (e.g., 400 of FIGS. 4 and 5). The vm_minor_fault tag record 500 is described by a tag record 510 which is shown in the example as having the name tnf_struct_1. Tag record 510 can also be characterized as having operations, slots, a name and a size. This is shown by the descriptive segment which follows:

```
sunw_base_probe_event_2::
    tag:          tnf_struct_1
    operations:   0
    slots:        ->       "tnf_tag           tag;
                            tnf_operations    operations;
                            tnf_string        slots;
                            tnf_string        name;
                            tnf_long          size;
                            tnf_string        keys;
                            tnf_string        detail;
                            tnf_long          line;
```

-continued

```
                            tnf_string        file;
                            tnf_symbol        procedure;"
    name:         ->       "sunw_base_probe_event_2"
    size:         44                       /* size of event record tag */
```

Record 510 further references another tag record 520 which defines the contents of tag record 510. This continues recursively down to record 530. Finally, the record 530 tnf_base_1 contains a reference in its tag field 531 which references the root record tnf_root_1 400 illustrated in FIG. 5 which was discussed above with reference to FIG. 4. Again, 400, because it is a root record, contains self-descriptive information in its slots field, and contains a self-referential tag in its tag field 401. In this manner, the analysis routines know that this is the root record. In addition, the record tnf_base_1, because it is described by the root record 400, must have the exact same format as the root, but is the only record which has this requirement in this implementation. The descriptive segments for tnf_struct_1 and tnf_base are shown below:

```
tnf_struct_1::
    tag:          tnf_base_1
    operations:   0
    slots:        ->       "tnf_tag           tag;
                            tnf_operations    operations;
                            tnf_string        slots;
                            tnf_string        name;
                            tnf_long          size;
                            "tnf_struct_1"
    name:         ->
    size:         20
```

The tag record that is described by the root must look like the root (but in this scheme it is the only one that needs to):

```
tnf_base_1::
    tag:          tnf_root_1
    operations:   0
    slots:        ->       "tnf_tag           tag;
                            tnf_operations    operations;
                            tnf_string        slots;
                            tnf_string        name;
                            tnf_long          size;
    name:         ->       "tnf_base_1"
    size:         20
    object:       sunw_trace
    platform:     platform
```

The TNF types described above are themselves TNF types as well. These are described by records also containing tags which reference records describing the types. An example of this is shown with reference to FIG. 6. 600 of FIG. 6, the tnf_tag record type, contains a tag field 601 which references a record tnf_base_type_1 in this example. Similarly, a tnf_byte_1 type may be represented by a record 610 also containing a tag reference 611 to tnf_base_type_1 620 shown in FIG. 6. The tnf_base_type_1 record 620 further contains a tag reference 621 which may refer back to one of the records illustrated with reference to FIG. 5, that is, the tnf_struct_1 base type shown as tag record 520 in FIG. 5. Then, the references continue as previously discussed with reference to FIG. 5. The descriptive segments for the foregoing described three records is shown below. The tnf_tag record 600 may appear as follows:

```
tnf_tag::
    tag:            tnf_base_type_1
    operations:     0
    type_name:      ->              "tnf_tag"
    type_size:      4
```

A tnf_byte_1 record (e.g., 610 of FIG. 6) might look like:

```
tnf_byte_1::
    tag:            tnf_base_type_1
    operations:     0
    type_name:      ->              "tnf_byte_1"
    type_size:      1
```

These tag records for these type reference a tnf_base_ type tag record for their descriptions:

```
tnf_base_type_1::
    tag:            tnf_struct_1
    operations:     0
    slots:          ->              "tnf_tag"        tag;
                                    tnf_operations   operations;
                                    tnf_string       type_name;
                                    tnf_long         type_size;"
    name:->         "tnf_base_type_1"
    size;           16
```

Finally, the last type of record which will be described here is the handling of arrays and string in implemented embodiments of the present invention. These are illustrated with reference to FIG. 7. A tnf_string is composed of a header followed by a null terminated, word fall padded array of one byte elements. The header includes a tag field shown as 701 in FIG. 7, an operations field and a field which contains the size of the record in bytes. The record will also contain a hash value for the string to improve performance of matching strings of certain symbols used against other symbols as illustrated in the below descriptive segments.

```
tnf_string::
    tag:            tnf_base_array_1
    operations:     0
    slots:          ->              "tnf_tag"        tag;
                                    tnf_hash_size    hash_size;
                                    tnf_byte_1       elements [ ];
    name:           ->              "tnf_string"
    type:           tnf_byte_1      /* elements of a string are bytes */
```

Figure 6:
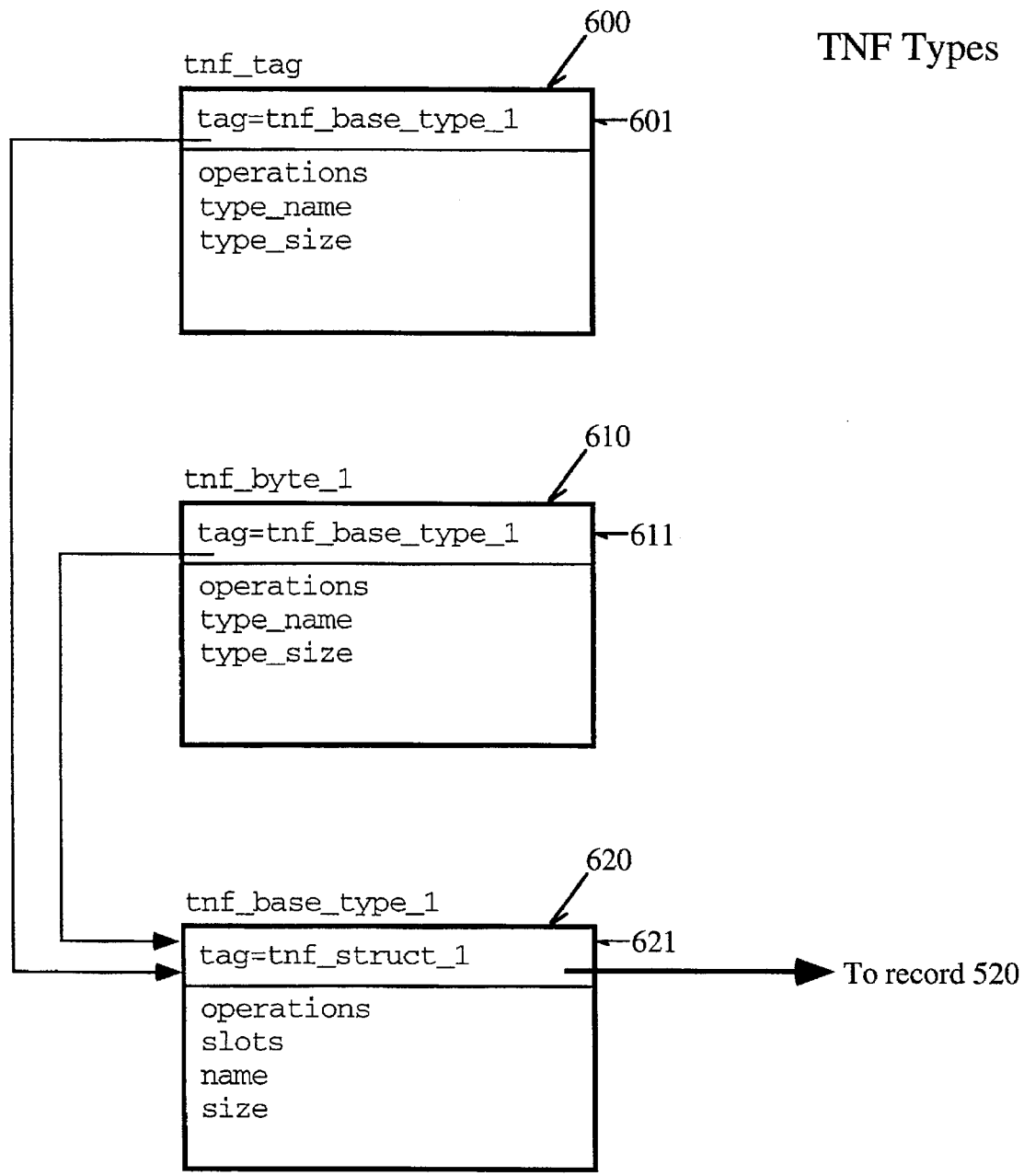

A tnf_byte references a tag record tnf_base_type (e.g., 610) as already discussed with reference to FIG. 6.

An array is described by a tag record that is a tnf_base_ array:

```
tnf_base_array_1::
    tag:            tnf_struct_1
    operations:     0
    slots:          ->              "tnf_tag"         tag;
                                    tnf_operations    operations;
                                    tnf_string        slots;
                                    tnf_string        name;
                                    tnf_base_type_1   type;"
    name:           ->              "tnf_array_1"
    size:           20
```

Figure 5:
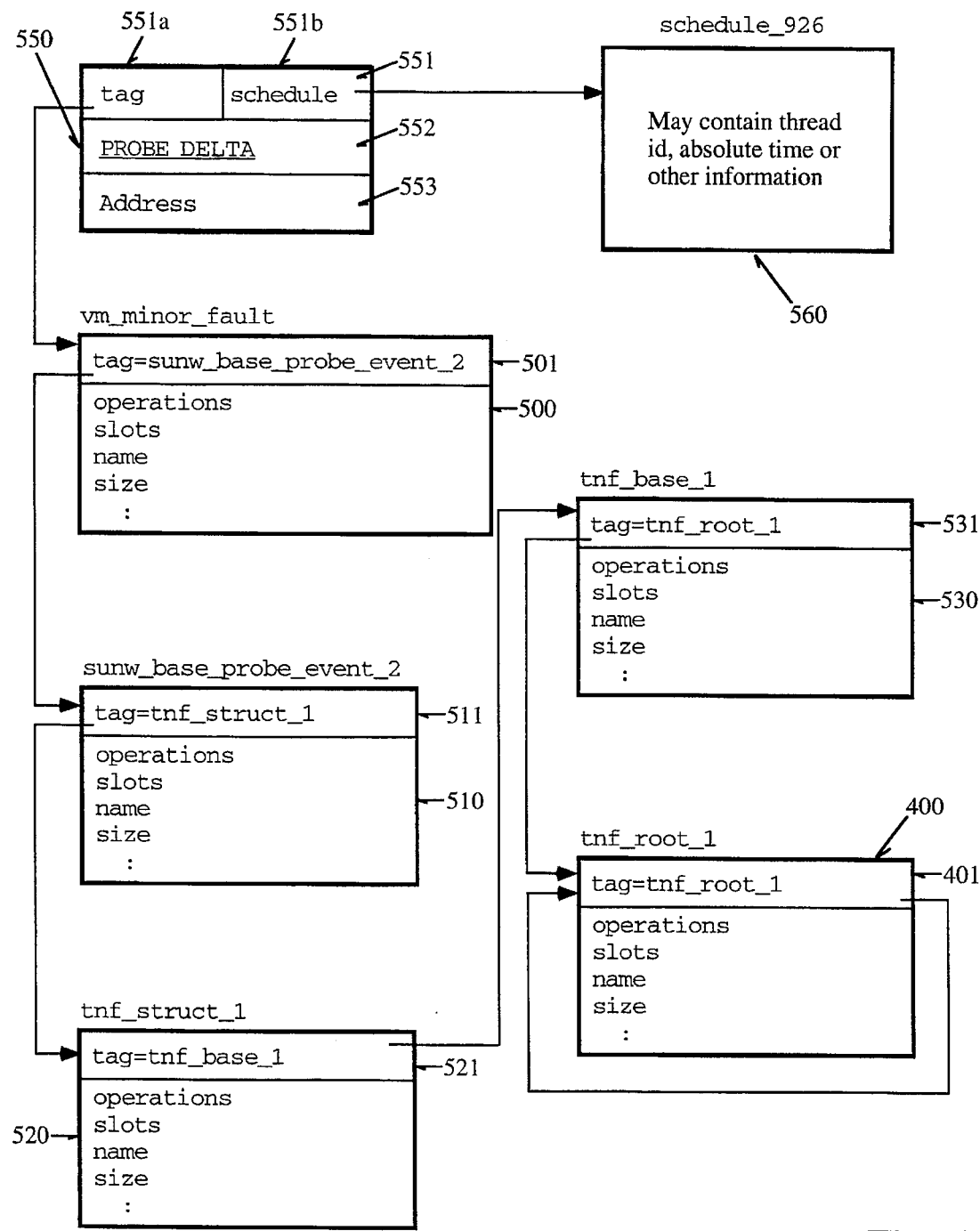
Figure 7:
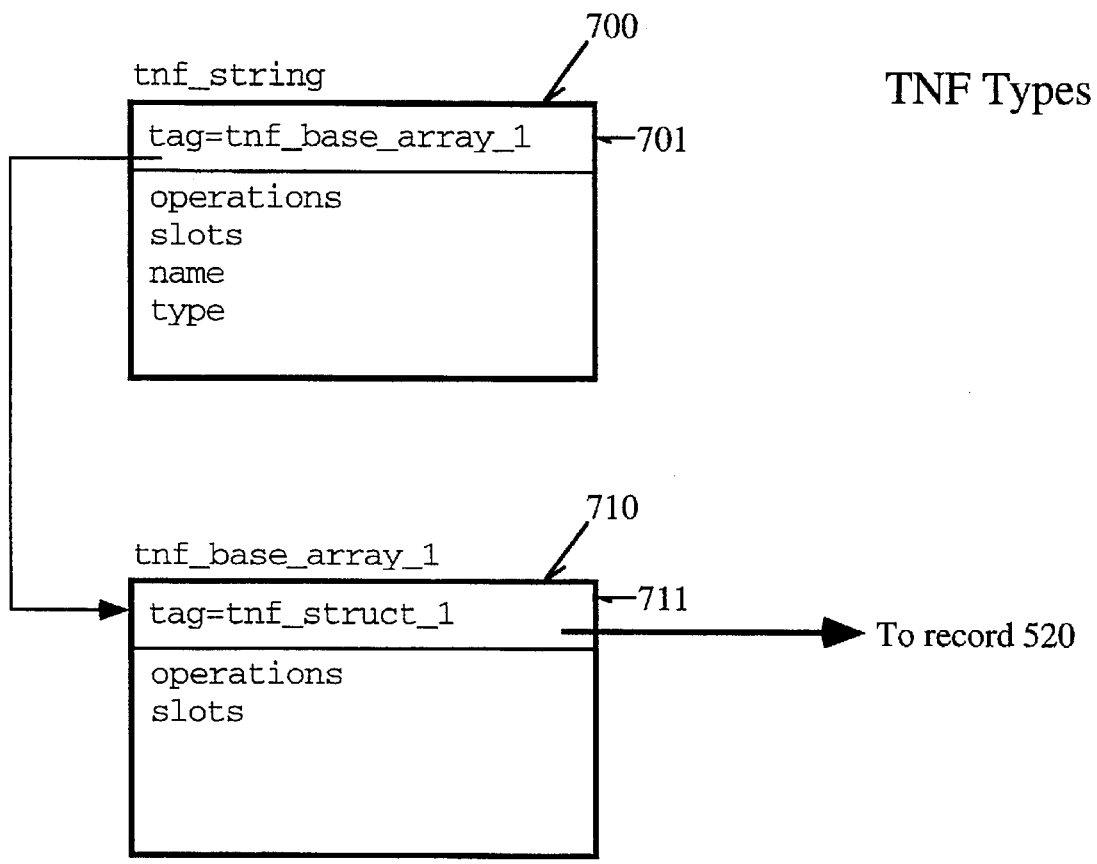

An illustration of the two records is shown in FIG. 7. 700, the tnf_string record has a tag in field 701 referring to the second record tnf_base_array_1 which references the tnf_ struct_1 520 shown in FIG. 5 and already discussed above. At any rate, using the records 700 and 710, either arrays or strings may be represented in implemented embodiments of the present invention which are then passed to the post-processing analysis routine via the trace file which may examine strings and arrays which may be present in a program under test.

A detailed dump of the TNF structures which are used in a particular implemented embodiment of the present invention is shown in Appendix A. Note that each of the records shown in the file "trace ASCII" shown in appendix A have an associated field tnf_tag which contains a hexadecimal reference address to the associated tag record. Thus, by matching the address preceding the TNF definition and the address stored in the tnf_tag field of each of the records in the dump, the inter-relationships of the various records generated in a TNF trace file may be determined.

The foregoing examples of such TNF files shown in FIGS. 3–7 are shown for illustrative purposes only and are not intended to limit the present invention. Thus, a comprehensive system for representing data in a first application program for representing data, such as that for test applications, and generating records and associated trace files which may be examined by a second application program, for example, and analysis routine has been described. The providing of data from the first routine to the second routine thus is a substantial advantage over prior art methods which require that the analysis program and/or test engineer know the type of data which is represented in the program under test, since now the data is tightly encoded with records describing the data itself and such encoding may be arranged so that the relationship between the data and the description of that data can be mapped from one process address space to another without modifications to the encoding. This is a substantial improvement over the prior art, and possesses unique advantage neither realized nor taught by the prior art. Although the present invention has been described with reference to specific embodiments in FIGS. 1–7, and the attached appendix A, these are not intended to limit the present invention, and the present invention is only be interpreted as limited by the appended claims which follow.

Appendix A traceascii

```
0xef300000 tnf_root_header:
            tnf_tag         0xef30002a
            tnf_long        -282328576
            tnf_long        64
            tnf_long        0
            tnf_long        44
            tnf_long        44
            tnf_long        0
            tnf_long        -282329088
            tnf_long        -282329088
            tnf_opaque      472

0xef30002c tnf_base:
            tnf_tag         0xef3000cc
            tnf_tag_code    27
            tnf_name        tnf_root_header
            tnf_slot_types  0xef300098
            tnf_size        44

0xef300040 tnf_root:
            tnf_tag         0xef3000e8
            tnf_tag_code    0
            tnf_name        tnf_root
            tnf_slot_types  0xef300234
            tnf_size        28
            tnf_library     libtnf.so.1
            tnf_platform    SPARC 0xef30005c tnf_derived_type:
            tnf_tag         0xef3000e8
            tnf_tag_code    16
            tnf_type_name   tnf_tag
            tnf_type_base   0xef3001bc 0xef30006c tnf_derived_type:
            tnf_tag         0xef3000e8
            tnf_tag_code    17
            tnf_type_name   tnf_tag_code
            tnf_type_base   0xef3001bc 0xef30007c tnf_derived_type:
            tnf_tag         0xef3000e8
            tnf_tag_code    18
            tnf_type_name   tnf_name
            tnf_type_base   0xef300164

0xef30008c tnf_derived_type:
            tnf_tag         0xef3000e8
            tnf_tag_code    19
            tnf_type_name   tnf_slot_types
            tnf_type_base   0xef300140

0xef30009c tnf_derived_type:
            tnf_tag         0xef3000e8
            tnf_tag_code    20
            tnf_type_name   tnf_size
            tnf_type_base   0xef3001bc 0xef3000ac tnf_derived_type:
            tnf_tag         0xef3000e8
            tnf_tag_code    21
            tnf_type_name   tnf_library
            tnf_type_base   0xef300164

0xef3000bc tnf_derived_type:
            tnf_tag         0xef3000e8
            tnf_tag_code    22
            tnf_type_name   tnf_platform
            tnf_type_base   0xef300164

0xef3000cc tnf_root:
            tnf_tag         0xef3000e8
            tnf_tag_code    1
            tnf_name        tnf_base
            tnf_slot_types  0xef300290
            tnf_size        20
            tnf_library     libtnf.so.1
            tnf_platform    SPARC 0xef3000e8 tnf_base:
            tnf_tag         0xef3000cc
            tnf_tag_code    2
            tnf_name        tnf_derived_type
            tnf_slot_types  0xef3002ec
            tnf_size        16

0xef3000fc tnf_derived_type:
            tnf_tag         0xef3000e8
            tnf_tag_code    3
            tnf_type_name   tnf_type_name
            tnf_type_base   0xef300164

0xef30010c tnf_derived_type:
            tnf_tag         0xef3000e8
            tnf_tag_code    4
            tnf_type_name   tnf_type_base
            tnf_type_base   0xef30005c 0xef30011c tnf_base:
            tnf_tag         0xef3000cc
            tnf_tag_code    5
            tnf_name        tnf_base_array
            tnf_slot_types  0xef30034c
            tnf_size        20

0xef300130 tnf_derived_type:
            tnf_tag         0xef3000e8
            tnf_tag_code    6
            tnf_type_name   tnf_header_types
            tnf_type_base   0xef300140

0xef300140 tnf_base_array:
            tnf_tag         0xef30011c
            tnf_tag_code    7
            tnf_name        tnf_tag_array
            tnf_header_types 0xef30039c
            tnf_element_type 0xef30005c 0xef300154 tnf_derived_type:
            tnf_tag         0xef3000e8
            tnf_tag_code    8
            tnf_type_name   tnf_element_type
            tnf_type_base   0xef30005c 0xef300164 tnf_base_array:
            tnf_tag         0xef30011c
            tnf_tag_code    9
```

FIG. 2

```
traceascii tnf_name          tnf_string
                 tnf_header_types  0xef300420
                 tnf_element_types 0xef3001cc 0xef300178 tnf_derived_type:
           tnf_tag           0xef3000e8
           tnf_tag_code      10
           tnf_type_name     tnf_hash_size
           tnf_type_base     0xef3001bc 0xef300188 tnf_base:
           tnf_tag           0xef3000cc
           tnf_tag_code      11
           tnf_name          tnf_base_type
           tnf_slot_types    0xef300460
           tnf_size          16

0xef30019c tnf_derived_type:
           tnf_tag           0xef3000e8
           tnf_tag_code      12
           tnf_type_name     tnf_type_size
           tnf_type_base     0xef3001ac 0xef3001ac tnf_base_type:
           tnf_tag           0xef300188
           tnf_tag_code      13
           tnf_type_name     tnf_long
           tnf_type_size     4

0xef3001bc tnf_base_type:
           tnf_tag           0xef300188
           tnf_tag_code      14
           tnf_type_name     tnf_long
           tnf_type_size     4

0xef3001cc tnf_base_type:
           tnf_tag           0xef300188
           tnf_tag_code      15
           tnf_type_name     tnf_byte
           tnf_type_size     1

0xef3001ec tnf_termination_record:
           tnf_tag           0xef300648
           tnf_long          1040
           tnf_long          1

0xef300600 tnf_block_header:
           tnf_tag           0xef300620
           tnf_long          0
           tnf_long          496
           tnf_long          0
           tnf_long          32
           tnf_long          32
           tnf_long          0
           tnf_long          0

0xef300620 tnf_base:
           tnf_tag           0xef3000cc
           tnf_tag_code      23
           tnf_name          tnf_block_header
           tnf_slot_types    0xef30057c
           tnf_size          32

0xef300634 tnf_base:
           tnf_tag           0xef3000cc
           tnf_tag_code      24
           tnf_name          tnf_generation_record
           tnf_slot_types    0xef3005c4
           tnf_size          8

0xef300648 tnf_base:
           tnf_tag           0xef3000cc
           tnf_tag_code      25
           tnf_name          tnf_termination_record
           tnf_slot_types    0xef300840
           tnf_size          12

0xef30065c tnf_base:
           tnf_tag           0xef3000cc
           tnf_tag_code      26
           tnf_name          tnf_sequence_record
           tnf_slot_types    0xef300870
           tnf_size          8

0xef300670 tnf_derived_type:
           tnf_tag           0xef3000e8
           tnf_tag_code      28
           tnf_type_name     tnf_opaque
           tnf_type_base     0xef3001bc 0xef300680 tnf_root:
           tnf_tag           0xef3000cc
           tnf_tag_code      29
           tnf_name          tnf_base
           tnf_slot_types    0xef3008f4
           tnf_size          20
           tnf_library       libtnf.so.1
           tnf_platform      SPARC 0xef30069c tnf_base:
           tnf_tag           0xef300188
           tnf_tag_code      30
           tnf_name          sunw_probe
           tnf_slot_types    0xef300948
           tnf_size          44

0xef3006b0 tnf_derived_type:
           tnf_tag           0xef3000e8
           tnf_tag_code      31
           tnf_type_name     tnf_slot_names
           tnf_type_base     0xef300164

0xef3006c0 tnf_derived_type:
           tnf_tag           0xef3000e8
           tnf_tag_code      32
           tnf_type_name     tnf_keys
           tnf_type_base     0xef300164

0xef3006d0 tnf_derived_type:
           tnf_tag           0xef3000e8
           tnf_tag_code      33
           tnf_type_name     tnf_detail
           tnf_type_base     0xef300164

0xef3006e0 tnf_derived_type:
           tnf_tag           0xef3000e8
           tnf_tag_code      34
           tnf_type_name     tnf_line
```

```
                                                                                    27D traceascii tnf_type_base    0xef3001bc                              tnf_long           0
                                                             tnf_long           0
0xef3000f0 tnf_derived_type:
    tnf_tag          0xef3000e8           0xef300220 tnf_string:
    tnf_tag_code     35                       tnf_tag                       0xef30007c
    tnf_type_name    tnf_file                 tnf_size                      0xef30008c
    tnf_type_base    0xef300164               tnf_hash_size                 20

0xef300700 tnf_derived_type:               0xef300234 tnf_tag_array:
    tnf_tag          0xef3000e8               tnf_tag                       0xef30008c
    tnf_tag_code     36                       tnf_size                      36
    tnf_type_name    tnf_testpoint
    tnf_type_base    0xef3001bc           0xef300258 tnf_string:
                                             tnf_tag                       0xef3000ac
0xef300710 sunw_probe:                       tnf_hash_size                 20
    tnf_tag          0xef30069c
    tnf_tag_code     37                   0xef3002ec tnf_string:
    tnf_name         before                  tnf_tag                       0xef3000bc
    tnf_slot_types   0xef300a48              tnf_hash_size                 16
    tnf_size         16
    tnf_slot_names   probe_event time_delta 0 0    0xef30027c tnf_string:
    tnf_keys         user                    tnf_tag                       0xef30007c
    tnf_detail       this probe is before the loop    tnf_hash_size         20
    tnf_line         23
    tnf_file         cookie.c             0xef300290 tnf_tag_array:
    tnf_testpoint    136184                  tnf_tag                       0xef30008c
                                             tnf_size                      28
0xef30073c tnf_derived_type:
    tnf_tag          0xef3000e8           0xef3002ac tnf_string:
    tnf_tag_code     38                       tnf_tag                       0xef3000ac
    tnf_type_name    tnf_probe_event          tnf_hash_size                 20
    tnf_type_base    0xef3001bc
                                         0xef3002c0 tnf_string:
0xef30074c tnf_derived_type:                 tnf_tag                       0xef3000bc
    tnf_tag          0xef3000e8               tnf_hash_size                 16
    tnf_tag_code     39
    tnf_type_name    tnf_time_delta      0xef3002d0 tnf_string:
    tnf_type_base    0xef3001bc               tnf_tag                       0xef30007c
                                             tnf_hash_size                 28
0xef30075c sunw_probe:
    tnf_tag          0xef30069c           0xef3002ec tnf_tag_array:
    tnf_tag_code     40                       tnf_tag                       0xef30008c
    tnf_name         inloop                   tnf_size                      24
    tnf_slot_types   0xef300b20
    tnf_size         16                   0xef300304 tnf_string:
    tnf_slot_names   probe_event time_delta 1 1    tnf_tag                 0xef3000fc
    tnf_keys         user                    tnf_hash_size                 24
    tnf_detail       this probe is in the loop
    tnf_line         45                   0xef30031c tnf_string:
    tnf_file         cookie.c                tnf_tag                       0xef30007c
    tnf_testpoint    136240                  tnf_hash_size                 24

0xef3007ec tnf_termination_record:        0xef300334 tnf_string:
    tnf_tag          0xef300640              tnf_tag                       0xef30008c
    tnf_long         0                       tnf_hash_size                 24
    tnf_long         0
                                         0xef30034c tnf_string:
0xef300200 tnf_block_header:                  tnf_tag                      0xef3000fc
    tnf_tag          0xef300620              tnf_hash_size                 28
    tnf_long         0
    tnf_long         496                  0xef300368 tnf_tag_array:
    tnf_long         0                       tnf_tag                       0xef30007c
    tnf_long         32                      tnf_size                      28
    tnf_long         32
                                         0xef300384 tnf_string:
```

```
                                                    traceascii tnf_tag       0xef30007c                       tnf_hash_size   16
                tnf_hash_size 24
                                                    0xef3003dc tnf_string:
0xef30039c tnf_tag_array:                                      tnf_tag         0xef3000fc
           tnf_tag       0xef300130                            tnf_hash_size   24
           tnf_size      16
                                                    0xef3004f4 tnf_string:
0xef3003ac tnf_string:                                         tnf_tag         0xef3000fc
           tnf_tag       0xef3000fc                            tnf_hash_size   20
           tnf_hash_size 28
                                                    0xef300508 tnf_string:
0xef3003c8 tnf_string:                                         tnf_tag         0xef3000fc
           tnf_tag       0xef30007c                            tnf_hash_size   24
           tnf_hash_size 20
                                                    0xef300520 tnf_string:
0xef3003ec tnf_termination_record:                             tnf_tag         0xef3000fc
           tnf_tag       0xef300648                            tnf_hash_size   20
           tnf_long      16
           tnf_long      1                          0xef300534 tnf_string:
                                                               tnf_tag         0xef3000fc
0xef300400 tnf_block_header:                                   tnf_hash_size   20
           tnf_tag       0xef300620
           tnf_long      -282329088                 0xef300548 tnf_string:
           tnf_long      496                                   tnf_tag         0xef3000fc
           tnf_long      0                                     tnf_hash_size   24
           tnf_long      32
           tnf_long      32                         0xef300560 tnf_string:
           tnf_long      0                                     tnf_tag         0xef30007c
           tnf_long      0                                     tnf_hash_size   28

0xef300420 tnf_tag_array:                           0xef30057c tnf_tag_array:
           tnf_tag       0xef300130                            tnf_tag         0xef30008c
           tnf_size      16                                    tnf_size        40

0xef300430 tnf_string:                              0xef3005a4 tnf_string:
           tnf_tag       0xef3000fc                            tnf_tag         0xef30007c
           tnf_hash_size 24                                    tnf_hash_size   32

0xef300448 tnf_string:                              0xef3005c4 tnf_tag_array:
           tnf_tag       0xef30007c                            tnf_tag         0xef300648
           tnf_hash_size 24                                    tnf_size        16

0xef300460 tnf_tag_array:                           0xef3005ec tnf_termination_record:
           tnf_tag       0xef3000Bc                            tnf_tag         0xef300648
           tnf_size      24                                    tnf_long        528
                                                               tnf_long        1
0xef300478 tnf_string:
           tnf_tag       0xef3000fc                 0xef300800 tnf_block_header:
           tnf_hash_size 24                                    tnf_tag         0xef300620
                                                               tnf_long        -282328064
0xef300490 tnf_string:                                         tnf_long        496
           tnf_tag       0xef3000fc                            tnf_long        0
           tnf_hash_size 20                                    tnf_long        32
                                                               tnf_long        32
0xef3004a4 tnf_string:                                         tnf_long        0
           tnf_tag       0xef3000fc                            tnf_long        0
           tnf_hash_size 20
                                                    0xef300820 tnf_string:
0xef3004b8 tnf_string:                                         tnf_tag         0xef3000fc
           tnf_tag       0xef3000fc                            tnf_hash_size   32
           tnf_hash_size 20
                                                    0xef300840 tnf_tag_array:
0xef3004cc tnf_string:                                         tnf_tag         0xef30008c
           tnf_tag       0xef3000fc                            tnf_size        20
```

```
                                              traceascii

0xef3009ec tnf_termination_record:
                                                       tnf_tag          0xef300648
                                                       tnf_long         16
                                                       tnf_long         1

0xef300a00 tnf_block_header:
                                                       tnf_tag          0xef300620
                                                       tnf_long         -282327040
                                                       tnf_long         496
                                                       tnf_long         0
                                                       tnf_long         32
                                                       tnf_long         32
                                                       tnf_long         0
                                                       tnf_long         0

0xef300a20 tnf_string:
                                                       tnf_tag          0xef3000fc
                                                       tnf_hash_size    24

0xef300a38 tnf_string:
                                                       tnf_tag          0xef30007c
                                                       tnf_hash_size    16

0xef300a48 tnf_tag_array:
                                                       tnf_tag          0xef30008c
                                                       tnf_size         24

0xef300a60 tnf_string:
                                                       tnf_tag          0xef3000fc
                                                       tnf_hash_size    24

0xef300a78 tnf_string:
                                                       tnf_tag          0xef3000fc
                                                       tnf_hash_size    24

0xef300a90 tnf_string:
                                                       tnf_tag          0xef3006b0
                                                       tnf_hash_size    36

0xef300ab4 tnf_string:
                                                       tnf_tag          0xef3006c0
                                                       tnf_hash_size    16

0xef300ac4 tnf_string:
                                                       tnf_tag          0xef3006d0
                                                       tnf_hash_size    40

0xef300aec tnf_string:
                                                       tnf_tag          0xef3006f0
                                                       tnf_hash_size    20

0xef300b00 before:
                                                       tnf_probe_event  -65966495
                                                       tnf_time_delta   -491500
                                                       tnf_long         0
                                                       tnf_long         0

0xef300b10 tnf_string:
                                                       tnf_tag          0xef30007c
                                                       tnf_hash_size    16

0xef300b20 tnf_tag_array:
                                                       tnf_tag          0xef30008c 0xef300854 tnf_string:
         tnf_tag          0xef30007c
         tnf_hash_size    20

0xef300870 tnf_tag_array:
         tnf_tag          0xef30008c
         tnf_size          16

0xef300880 tnf_string:
         tnf_tag          0xef30007c
         tnf_hash_size    24

0xef300898 tnf_tag_array:
         tnf_tag          0xef30008c
         tnf_size         52

0xef3008cc tnf_string:
         tnf_tag          0xef3000fc
         tnf_hash_size    20

0xef3008e0 tnf_string:
         tnf_tag          0xef30007c
         tnf_hash_size    20

0xef3008f4 tnf_tag_array:
         tnf_tag          0xef30008c
         tnf_size         28

0xef300910 tnf_string:
         tnf_tag          0xef3000ac
         tnf_hash_size    20

0xef300924 tnf_string:
         tnf_tag          0xef3000bc
         tnf_hash_size    16

0xef300934 tnf_string:
         tnf_tag          0xef30007c
         tnf_hash_size    20

0xef300948 tnf_tag_array:
         tnf_tag          0xef30008c
         tnf_size         52

0xef30097c tnf_string:
         tnf_tag          0xef3000fc
         tnf_hash_size    24

0xef300994 tnf_string:
         tnf_tag          0xef3000fc
         tnf_hash_size    20

0xef3009a8 tnf_string:
         tnf_tag          0xef3000fc
         tnf_hash_size    20

0xef3009bc tnf_string:
         tnf_tag          0xef3000fc
         tnf_hash_size    20

0xef3009d0 tnf_string:
         tnf_tag          0xef3000fc
         tnf_hash_size    20
```

```
10:49:25                                                              traceascii tnf_size                24

0xef300b38 tnf_string:
        tnf_tag            0xef3006b0
        tnf_hash_size      36

0xef300b5c tnf_string:
        tnf_tag            0xef3006c0
        tnf_hash_size      16

0xef300b6c tnf_string:
        tnf_tag            0xef3006d0
        tnf_hash_size      36

0xef300b90 tnf_string:
        tnf_tag            0xef3006f0
        tnf_hash_size      20

0xef300ba4 inloop:
        tnf_probe_event    -71633827
        tnf_time_delta     -392000
        tnf_long           0
        tnf_long           0

0xef300bb4 inloop:
        tnf_probe_event    -72682419
        tnf_time_delta     1137500
        tnf_long           1
        tnf_long           1

0xef300bc4 inloop:
        tnf_probe_event    -73731011
        tnf_time_delta     2262500
        tnf_long           2
        tnf_long           2

0xef300bd4 inloop:
        tnf_probe_event    -74779603
        tnf_time_delta     3389000
        tnf_long           3
        tnf_long           3

0xef300bec tnf_termination_record:
        tnf_tag            0xef300648
        tnf_long           16
        tnf_long           1

0xef300c00 tnf_block_header:
        tnf_tag            0xef300620
        tnf_long           0
        tnf_long           496
        tnf_long           0
        tnf_long           32
        tnf_long           32
        tnf_long           0
        tnf_long           0

0xef300c20 inloop:
        tnf_probe_event    -79760415
        tnf_time_delta     4551500
        tnf_long           4
        tnf_long           4

0xef300c30 inloop:
        tnf_probe_event    -80809007
        tnf_time_delta     2114120500
        tnf_long           0
        tnf_long           0

0xef300c40 inloop:
        tnf_probe_event    -81857599
        tnf_time_delta     2115247500
        tnf_long           1
        tnf_long           1

0xef300c50 inloop:
        tnf_probe_event    -82906191
        tnf_time_delta     2116364000
        tnf_long           2
        tnf_long           2

0xef300c60 inloop:
        tnf_probe_event    -83954783
        tnf_time_delta     2117481500
        tnf_long           3
        tnf_long           3

0xef300c70 inloop:
        tnf_probe_event    -85003375
        tnf_time_delta     2118636000
        tnf_long           4
        tnf_long           4

0xef300dec tnf_termination_record:
        tnf_tag            0xef300648
        tnf_long           0
        tnf_long           0
```

27a

What is claimed is:

1. A computer-implemented method in a computer system of providing data from a first application program to a second application program during runtime comprising the following steps:
  a. including in said first application program a linkage to a library of data types for describing data in said first application program, said library of data types enabling examination of said data in said first application program having said data types from said second application program, said library of data types comprising a definition of a record including:
    i. a plurality of fields each containing identifying information associated with said record;
    ii. a reference to a tag record, said tag record listing names and types of each of said plurality of fields contained in said referencing record, said tag record further recursively referencing a plurality of tag records each referencing an associated tag record listing the names and types of fields in referencing tag record, and ultimately, referencing a root record including a self-reference to a list of names and types of fields contained in said root record;
  b. including in said first application object definitions for said data in said first application program according to said library of data types;
  c. enabling said object definitions;
  d. said second application program referencing said data at runtime by referencing a runtime record containing said data according to said object definitions, said second application program determining the nature of said data by referencing said runtime record and associated plurality of tag records, recursively, until reaching said root record; and
  e. said second application manipulating said data via said object definitions according to said nature of said data specified by said runtime record, said tag record and said plurality of tag records.

2. The method of claim 1 wherein said definition of said record further includes a platform field for specifying a platform in which said data is native.

3. The method of claim 1 wherein said definition of said record further includes an operations field for use by said second application program during said manipulating of said data.

4. The method of claim 1 wherein said definition of said record further includes a size field for use by said second application program to determine said size of said record.

5. The method of claim 1 wherein said definition of said record further includes a name field for identifying said data.

6. The method of claim 1 wherein said runtime record comprises an event record which includes fields identifying a runtime event in said first application program.

7. The method of claim 6 wherein said fields in said event record include a type field identifying a type of runtime event which occurred in said first application program.

8. The method of claim 6 wherein said fields in said event record include a time field identifying a time at which said runtime event occurred in said first application program.

9. The method of claim 7 wherein said time field includes a relative time in said first application at which said runtime event occurred.

10. The method of claim 6 wherein said fields in said event record include a address field identifying an address at which said runtime event occurred in said first application program.

11. The method of claim 1 wherein said reference to said tag is at a predetermined position from a start of said record.

12. A computer-implemented method in a computer system of processing data generated in a first application program by a second application program during runtime, said method comprising the following steps:
  a. said first application program generating records during said runtime, said records including:
    i. a plurality of fields, at least one of said plurality of fields containing data generated by said first application program, and other of said plurality of fields containing descriptive information regarding said generated data;
    ii. a reference to a tag record, said tag record listing names of each of said plurality of fields contained in said referencing record, said tag record further recursively referencing a plurality of tag records, each referencing an associated tag record identifying fields in said referencing tag record, and ultimately, referencing a root record including a self-referential tag identifying said fields in said root record;
  b. said second application program receiving said generated records, and referencing said tag record and each of said plurality of associated tag records, recursively, until reaching said root record in order to identify said data by referencing said plurality of fields in each of said associated tag records; and
  c. said second application manipulating said data according to said identifying of said data specified by said record, said tag record and each of said plurality of associated tag records.

13. An apparatus in a computer system for processing data generated in a first application program by a second application program during runtime comprising:
  a. first circuitry for generating a record at said runtime from said first application program, said record including:
    i. a plurality of fields, at least one of said plurality of fields containing data generated by said first application program, and other of said plurality of fields containing descriptive information regarding said generated data;
    ii. a reference to a tag record, said tag record listing names of each of said plurality of fields contained in said record, said tag record further recursively referencing a plurality of tag records each referencing an associated tag record identifying fields in said referencing tag record, and ultimately, referencing a root record including a self-referential tag identifying said fields in said root record;
  b. second circuitry for receiving said record for second application program, and referencing said tag record and each of said plurality of associated tag records, recursively, until reaching said root record in order to identify said data by referencing said plurality of fields in each of said associated tag records; and
  c. third circuitry for manipulating said data in said second application according to said identifying of said data specified by said record, said tag record and each of said plurality of associated tag records.

14. A computer-implemented method in a computer system of processing data used in a first application program comprising the following steps:
  a. generating data in a record, said record including:
    i. a plurality of fields each containing identifying information of said data in said record; and ii. a reference to a tag record, said tag record listing names and types of said plurality of fields in said referencing record, said tag record further recursively referencing a plurality of tag records each referencing an associated tag record listing the names and types of fields in said referencing tag record, and ultimately, referencing a root record which includes a self-reference and fields listing names and types of plurality of fields in said root record;

b. a second application program referencing said data, said tag record and said plurality of tag records, recursively, until reaching said root record; and c. said second application processing said data according to said tag record and said plurality of tag records.

15. The method of claim 14 wherein said record further includes a platform field for specifying a platform in which said data is native.

16. The method of claim 14 wherein said said record further includes an operations field for use by said second application program during said manipulating of said data.

17. The method of claim 14 wherein said record further includes a size field for use by said second application program to determine said size of said record.

18. The method of claim 14 wherein said record further includes a name field for identifying said data.

19. The method of claim 14 wherein said record comprises an event record which includes fields identifying a runtime event in said first application program.

20. The method of claim 19 wherein said fields in said event record include a type field identifying a type of runtime event which occurred in said first application program.

21. The method of claim 19 wherein said fields in said event record include a time field identifying a time at which said runtime event occurred in said first application program.

22. The method of claim 21 wherein said time field includes a relative time in said first application at which said runtime event occurred.

23. The method of claim 19 wherein said fields in said event record include a address field identifying an address at which said runtime event occurred in said first application program.

24. The method of claim 14 wherein said reference to said tag is at a predetermined position from a start of said record.

* * * * *